United States Patent

Small, IV et al.

[11] Patent Number: 6,012,840
[45] Date of Patent: Jan. 11, 2000

[54] SINGLE-FIBER MULTI-COLOR PYROMETRY

[75] Inventors: Ward Small, IV, Livermore; Peter Celliers, Berkeley, both of Calif.

[73] Assignee: The Regents of the University of California, Oakland, Calif.

[21] Appl. No.: 08/789,366

[22] Filed: Jan. 27, 1997

[51] Int. Cl.$^7$ .................................. G01J 5/08; G01J 5/62
[52] U.S. Cl. ........................ 374/126; 374/128; 374/133; 374/130
[58] Field of Search .................................. 374/128, 129, 374/112, 161, 122, 141, 123, 126, 133, 130; 356/45

[56] References Cited

U.S. PATENT DOCUMENTS

| | | | |
|---|---|---|---|
| 3,261,257 | 7/1966 | Pfister . | |
| 3,444,739 | 5/1969 | Theharne | 374/128 |
| 3,619,059 | 11/1971 | Muller et al. | 356/45 |
| 3,672,217 | 6/1972 | Naya et al. . | |
| 3,715,922 | 2/1973 | Menge . | |
| 3,759,102 | 9/1973 | Murray | 374/123 |
| 4,301,682 | 11/1981 | Everest | 374/112 |
| 4,326,798 | 4/1982 | Kahn | 356/112 |
| 4,458,147 | 7/1984 | Vogl et al. | 250/233 |
| 4,470,710 | 9/1984 | Crane et al. | 374/127 |
| 4,575,259 | 3/1986 | Bacci et al. | 374/161 |
| 4,619,533 | 10/1986 | Lucas et al. | 374/141 |
| 4,679,934 | 7/1987 | Ganguly et al. | 356/43 |
| 4,815,841 | 3/1989 | Bickler et al. | 356/43 |
| 4,907,895 | 3/1990 | Everest | 374/130 |
| 5,317,656 | 5/1994 | Moslehi et al. | 385/12 |
| 5,564,830 | 10/1996 | Bobel et al. | 374/129 |
| 5,573,339 | 11/1996 | Woskow | 374/122 |

OTHER PUBLICATIONS

Eyal. O. et al., Temperature Measurements Utilizing Two–Bandpass Fiber Optic Radiometry. Optic Engineering 1995, vol. 34 No. 2, pp. 470–473, Feb. 1995.

Small IV W, et al., Laser Tissue Welding Mediated With A Protein Solder. SPIE. 1996, vol 2671, pp. 256–260, May 1969.

J. Brownson, K. Gronokowski, E. Meada, "Two–Color Imaging Radiometry for Pyrotechnic Diagnostics," Thermosense IX, Proc. SPIE vol. 780 pp. 194–201 (1987).

A. S. Tenney, Radiation Ratio Thermometry, Theory and Practice of Radiation Thermometry. D. P. Dewitt and G. D. Nutter (eds.). New York: John Wiley and Sons, Inc., pp. 459–494, 1988.

X.Maldague and M. Dufour, "Dual imager and its applications to active vision robot welding, surface inspection, and two–color pyrometry," Optical Engineering vol. 20 No. 8, pp. 872–880, Aug. 1989.

Gang He and Maraek T. Wlodarczyk, "Dual–Wavelength Fiber Optic Temperature Sensor," Fiber Optic and Laser Sensors XI, Proc. SPIE vol. 2070, pp. 464–471, 1993.

Zhiquan Li, Jinglin Tang, Xiangchun Han, and Ming Zhang, "Two–Color ratio pyrometer with optical fibre for over––heating gas," Fiber Optic and Laser Sensors XI, Proc. SPIE vol. 2070, pp.508–513, 1993.

Ophir Eyal and Abraham Katzir, "Temperature measurements utilizing two–bandpass fiber optic radiometry," Optical Engineering vol. 34 No. 2, pp. 470–473, (Feb. 1995).

U. Anselmi–Tamburini et al, "A two–color spatial–scanning pyrometer for the determination of temperature profiles in combustion synthesis reactions," Rev Sci Instrum vol 66 No. 10, pp. 5006–5014, Oct. 1995.

Ward Small IV et al, "Laser tissue welding mediated with a protein solder," Laser Welding: Control, Delivery Systems, and Clinical Applications, SPIE vol. 2671, pp. 256–260, 1996.

Yair Dankner, O. Eyal, and A. Katzir, "Two–bandpass fiber–optic radiometry for monitoring the temperature of photoresist during dry processing," Appl. Phys. Letters vol. 68 No. 18, pp. 2583–2585, apr. 1996.

*Primary Examiner*—Diego Gutierrez
*Assistant Examiner*—Maria Fernandez
*Attorney, Agent, or Firm*—John P. Wooldridge

[57] ABSTRACT

This invention is a fiber-based multi-color pyrometry set-up for real-time non-contact temperature and emissivity measurement. The system includes a single optical fiber to collect radiation emitted by a target, a reflective rotating chopper to split the collected radiation into two or more paths while modulating the radiation for lock-in amplification (i.e., phase-sensitive detection), at least two detectors possibly of different spectral bandwidths with or without filters to limit the wavelength regions detected and optics to direct and focus the radiation onto the sensitive areas of the detectors. A computer algorithm is used to calculate the true temperature and emissivity of a target based on blackbody calibrations. The system components are enclosed in a light-tight housing, with provision for the fiber to extend outside to collect the radiation. Radiation emitted by the target is transmitted through the fiber to the reflective chopper, which either allows the radiation to pass straight through or reflects the radiation into one or more separate paths. Each path includes a detector with or without filters and corresponding optics to direct and focus the radiation onto the active area of the detector. The signals are recovered using lock-in amplification. Calibration formulas for the signals obtained using a blackbody of known temperature are used to compute the true temperature and emissivity of the target. The temperature range of the pyrometer system is determined by the spectral characteristics of the optical components.

2 Claims, 6 Drawing Sheets

SINGLE-FIBER MULTI-COLOR PYROMETRY

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to temperature measurement using pyrometry, and more specifically, it relates to the measurement of temperature and emissivity using single-fiber multi-color pyrometry.

2. Description of Related Art

Radiation thermometry is a common non-contact method of measuring temperature. Planck's Law states that the spectral radiance of a target is a function of its temperature. Hence, the signal produced by a detector that is sensitive to all or part of the radiated thermal spectrum will be related to the temperature of the target. However, the spectral radiance of a target is also governed by its emissivity. Consequently, the signal will depend on the emissivity of the target as well as its temperature. Furthermore, the measured radiance may be comprised of unwanted ambient system radiance as well as the desired target radiance, and may be weak compared to the detector background level.

Currently, many temperature sensing devices employ the method of two-color pyrometry to eliminate the effect of unknown or varying emissivity. Two-color pyrometers sample the target radiance in two different spectral regions, and calculate the true temperature and/or emissivity using various algorithms. Several techniques for separating the target radiance into two spectral regions have been identified. One technique involves a beamsplitter to direct the incident radiation into two paths, each of which contains a detector. A second method incorporates a rotating filter wheel composed of two different filters and a single detector. Another method uses a two-color detector consisting of two different active regions. As with any radiation thermometer, the spectral characteristics of the optical components determine the useful temperature range of the device.

The systems developed by X. Maldague, et. al. [Opt. Eng. 28(8):872–80] and U. Anselmi-Tamburini, et. al. [Rev. Sci. Instr. 66(10):5006–10] both employ beamsplitters to separate the incident radiation into two paths, each of which contains a detector. The device patented by K. Crane, et. al. [U.S. Pat. No. 4,470,710] employs a wheel composed of alternating infrared filters of different bandpass and a single detector. These systems are suited only to high-temperature measurement. High-temperature measurement methods require large target signals that are generally much stronger that any ambient radiation. In general, simply replacing the optical components in high-temperature devices with longer wavelength components will not provide a clear signal for low-temperature measurement, because the necessary means of distinguishing the small target signal from the ambient noise is missing.

The system developed by O. Eyal and A. Katzir [Opt. Eng. 34(2):470–3] exhibits state-of-the-art technology for remote low-temperature two-color pyrometry. A single silver halide optical fiber collects radiation emitted by a target and transmits it to an optical chopper which modulates the radiation for lock-in amplification before it is focused onto a single two-color mid-infrared detector. The side of the chopper facing the detector is made reflective to stabilize the lock-in signals by one of two methods: either a reference blackbody of controlled temperature is positioned such that the detector alternately "sees" it and the target, or a black line is drawn on the chopper blades to control its emissivity. This device offers several features. First, the use of a single collection fiber ensures that each spectral region is comprised of radiation emitted by the same spot on the target, which, when coupled with the two-color principle, minimizes the influence of the area of the spot (i.e. fiber tip to target distance). Second, lock-in amplification enables recovery of small signals generated by low-temperature targets. Third, the reflective chopper provides a means of lock-in signal referencing. Fourth, the two-color mid-infrared detector incorporates the two active regions in a single element. If the spectral sensitivities of the optical components were chosen differently, high-temperature measurements could theoretically be made using the same method.

There is a need to perform color-temperature measurements using a fiber-based system in which the detected radiation is collected by a single fiber, and the radiation is detected in two or more wavelength bands. Single fiber collection eliminates the need to align multiple fibers to a common spot on the target. The method of Eyal and Katzir allows such a measurement technique using an integrated two-color detector system, but its extension to multiple wavelength bands is limited by detector technology. The present invention may be extended to multiple bands, and does not rely on sophisticated detector arrangements. Like the above low-temperature device, this method uses a single optical fiber to ensure that the radiation collected in each spectral band originates from the same spot on the target.

SUMMARY OF THE INVENTION

It is an object of the invention to noninvasively measure temperature and emissivity of a target in real-time.

It is another object of the present invention to noninvasively monitor the surface temperature and emissivity of biological tissues before, during, and after laser irradiation.

It is also an object of the invention to provide a feedback loop to control laser power output during irradiation of biological tissues for laser tissue welding.

This invention is an apparatus and method for non-contact real-time true temperature and emissivity measurement. A single fiber is used to couple the spectral radiance from a spot on the target into a multi-color pyrometer, which consists of a reflective chopper, two or more detectors possibly of different spectral bandwidth with or without filters to limit the wavelength regions detected, optics to direct and focus the radiation onto the detectors, lock-in amplification, and a computer algorithm based on previous blackbody calibrations. Among the advantages of this method are (i) the radiation signal collected by the fiber is independent of the fiber to target distance (for a target of uniform temperature over the observed surface area); (ii) the radiation observed through all channels originates from the same geometric region on the target (which is not true when a different fiber is used to collect radiation for each channel); (iii) the measured temperature is independent of the target emissivity and corresponds to the true target temperature if the emissivity is independent of wavelength within the measurement band; and (iv) target emissivity can be determined.

The radiation transmitted by the fiber is either passed or reflected by a reflective chopper, thus modulating the radiation for lock-in amplification and splitting the radiation into two or more paths simultaneously. Each path consists of a detector and focusing optics, and possibly optical filters to limit the spectral bandpass of the radiation incident on the detector. If no filters are used, then the detectors must all have different spectral sensitivities. The use of multiple paths as provided by the reflective chopper allows for the addition (or subtraction) of detectors, making the system a multi-color, as opposed to a strictly two-color, pyrometer. Furthermore, separate paths offer more freedom in choosing detectors and filters. The reflective chopper, which splits the incident radiation into two or more paths, while simultaneously modulating the radiation for lock-in amplification, eliminates the need for additional components to split the radiation. For the case of a two-color system, the chopper could be a rotating planar disk with alternating reflective and transmissive veins. It may also consist of a multi-faceted reflective surface to reflect the beam into various paths. The chopper may also be constructed with other types of mechanical devices commonly used for chopping light signals, such as a resonant arm device with a multifaceted optic.

The detection system measures the radiation intensity emitted by the target in each of the spectral bands using lock-in amplification. The lock-in signals are proportional to the difference between the target signal and a background signal originating from the background radiation field within the detection system. (In the chopper-closed position, the radiation striking the detector originates from the background only while in the chopper-open position the radiation striking the detector originates from the target as well as the background.) Calibration of the system requires measurements of the signal levels for each channel as a function of target temperature, using a target with known emissivity (usually a blackbody with emissivity equal to 1). These calibration curves can be fit accurately with a simple parametric function and used for numerical solution during measurements of target signals. Variations in the background level arising from temperature drifts may be compensated by independently measuring the background temperature (with a thermocouple) and applying temperature-dependent corrections to the measured signal levels.

A computer algorithm computes the true temperature and emissivity in real time using the resulting signals and the previous blackbody calibration. For a measurement system operating at near-ambient or lower temperatures, a thermocouple mounted inside the closed system is needed to monitor fluctuations in the background temperature, allowing for dynamic compensation of the background level. There is no need for an additional temperature-controlled blackbody or other referencing means. The resulting signals are converted to temperature and emissivity based on a temperature-controlled blackbody calibration. This method can be tailored to various temperature ranges by selecting the appropriate spectral characteristics for the optical components.

The temperature range of the pyrometer system is determined by the spectral characteristics of the optical components. The spectral characteristics of the fiber, detectors, and filters govern the useful temperature range, as implied by Planck's Law. The spectral bandwidths of the detectors and any filters must be at least partially included in the radiated thermal spectrum. Furthermore, the bandwidth of the fiber must at least partially include the spectral regions sensed by the detectors. The wavelength region sensed by one of the detectors relative to that of the other also affects the useful temperature range. For example, for two-color pyrometry, if the calibration yields a ratio that is nearly independent of the temperature or, similarly, the two detector calibration equations are degenerate or without a simultaneous solution, then accurate measurement of the temperature and emissivity is not likely.

Dynamic room temperature-regime measurements for a target of unknown or changing emissivity can be made using this multi-color system with mid-infrared optical components. Such a system has been developed that incorporates the two-color principle using a single hollow glass waveguide and thermoelectrically cooled HgCdZnTe photoconductors along with the reflective chopper/lock-in amplification set-up. A 700 $\mu$m-bore hollow glass waveguide coated with a dielectric layer on the inner surface, capable of transmitting wavelengths greater than 2 $\mu$m, is used to collect the spectral radiance from the target. A gold-coated planar chopper is used to split and modulate the incident radiation. Two 128.8 mm-radius gold-coated spherical mirrors focus the radiation onto their corresponding HgCdZnTe photoconductors. The spectral bandwidths of the photoconductors are 2–12 $\mu$m and 2–6 $\mu$m, respectively. This particular configuration permits measurement of temperatures from below room temperature to above 200° C. Radiation from a target is collected via the single 700 $\mu$m-bore hollow glass optical fiber coated with a dielectric layer on the inner surface, simultaneously split into two paths and modulated by the gold-coated reflective chopper, and focused onto the two thermoelectrically-cooled mid-infrared HgCdZnTe photoconductors by the 128.8 mm-radius gold-coated spherical mirrors. The modulated detector signals are recovered using lock-in amplification. The two signals are calibrated using a blackbody (emissivity equal to 1) of known temperature, and exponential fits are applied to the two resulting voltage versus temperature curves. Using the two calibration equations, a computer algorithm calculates the temperature and emissivity of a target in real time, taking into account reflection of the background radiation field from the target surface.

The present invention may be used to noninvasively monitor the surface temperature and emissivity of biological tissues before, during, and after laser irradiation. It may be used in a feedback loop to control laser power output during irradiation of biological tissues for laser tissue welding. The invention could be used to noninvasively measure temperature and emissivity of a target in real-time.

DETAILED DESCRIPTION OF THE INVENTION

Radiation thermometry is a common non-contact method of measuring temperature. In particular, the technique of two-color pyrometry compensates for the effect of unknown emissivity, which can vary with temperature and surface quality. Two-color pyrometers sample the target radiance in two different spectral regions, and calculate the true temperature and/or emissivity using various algorithms. Many methods of separating the incident radiation into two spectral bands have been used, including using a beamsplitter with two detectors, a rotating filter wheel composed of two different filters with a single detector, and a single detector consisting of two different active regions. Once the radiation is divided into two distinct spectral bands, possible methods of calculation include calibrating the ratio of the two signals which is independent of the emissivity (assuming the emissivity is independent of the wavelength) or solving the two detector response equations simultaneously for the temperature and emissivity. The spectral characteristics of the optical components and the sensitivity of the system determine the useful temperature range of any radiation thermometer.

An embodiment of the present invention comprises a two-color mid-infrared thermometer incorporating a single hollow glass optical fiber and lock-in amplification for low-temperature measurement. This invention is equally suitable for use with high temperature measurements simply by adjusting the spectral range of the fiber optic, beamsplitter(s), detectors and associated optics. The radiation collected by the hollow glass optical fiber is simultaneously split into two paths and modulated by a reflective optical chopper. Each path contains a detector, whose signal is recovered using lock-in amplification. The temperature and emissivity are iteratively calculated in real time from the two detector response equations, taking into account reflection of the background radiation field from the target surface. The mid-infrared spectral bandpass of the system, together with the lock-in amplification, enables measurement of the small signals emitted from targets below room temperature.

Figure 1:
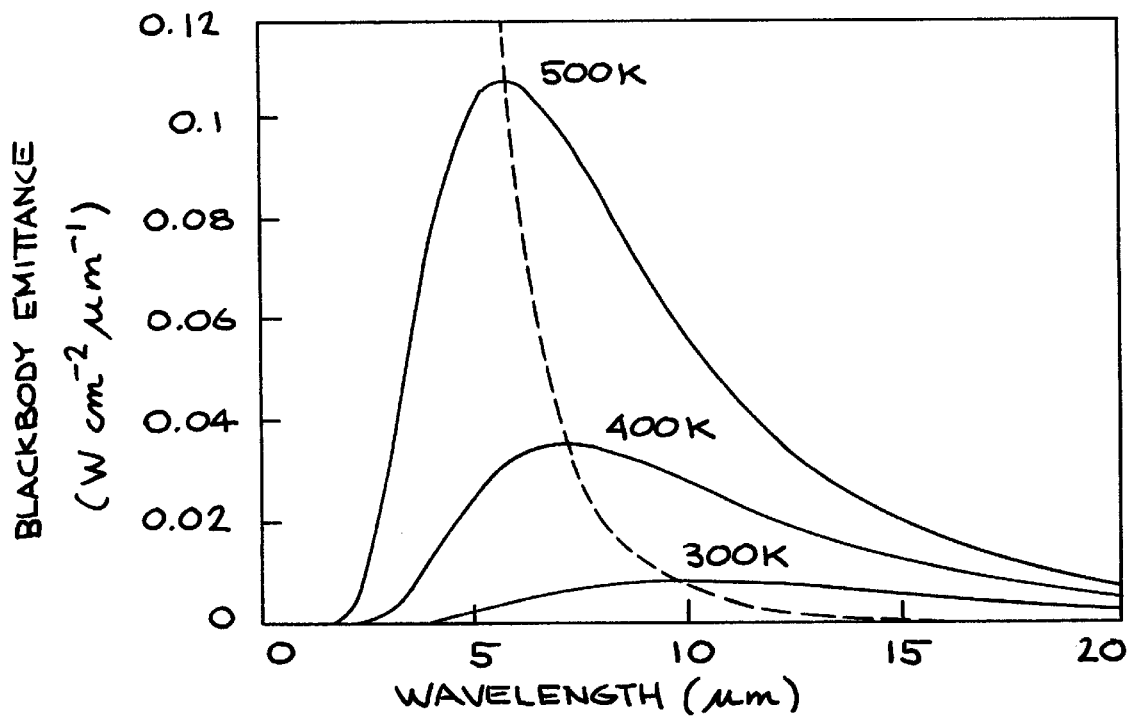
FIG. 1 shows blackbody spectral distributions calculated from Planck's Law for temperatures of 300, 400, and 500 K.

The spectral radiant emittance of a blackbody (emissivity equal to 1) is given by Planck's Law, $$W_{bb}(\lambda, T) = \frac{2\pi h c^2}{\lambda^5} \frac{1}{e^{hc/\lambda kT} - 1} W \ cm^{-2} \ \mu m^{-1}, \quad (1)$$

where h is Planck's constant [$6.626 \times 10^{-34}$ Js], c is the speed of light [$2.998 \times 10^8$ m/s], $\lambda$ is the wavelength [$\mu$m], k is Boltzmann's constant [$1.381 \times 10^{-23}$ J/K], and T is the blackbody temperature [K]. FIG. 1 shows the blackbody emittance versus wavelength for several temperatures. Because the spectral distribution is a function of the temperature, the signal produced by a detector that is sensitive to all or part of the radiated thermal spectrum of the blackbody will be related to its temperature. The figure illustrates the blackbody spectral distributions calculated from Planck's Law for temperatures of 300, 400, and 500 K. The dotted line shows the location of the maxima of all temperature curves.

Assuming lambertian emission, the signal yielded by a detector using an optical fiber to collect the blackbody radiation is given by $$V_{bb}(T) = \int \int dA_f dA_t \frac{\cos^2\theta}{R^2} \int_{\lambda_{min}}^{\lambda_{max}} d\lambda W_{bb}^r(\lambda, T) F(\lambda) S(\lambda) V, \quad (2)$$

where $$W_{bb}^r(\lambda, T) = \frac{1}{\pi} W_{bb}(\lambda, T) W \ cm^{-2} \ \mu m^{-1} \ sr^{-1}, \quad (3)$$

Figure 2:
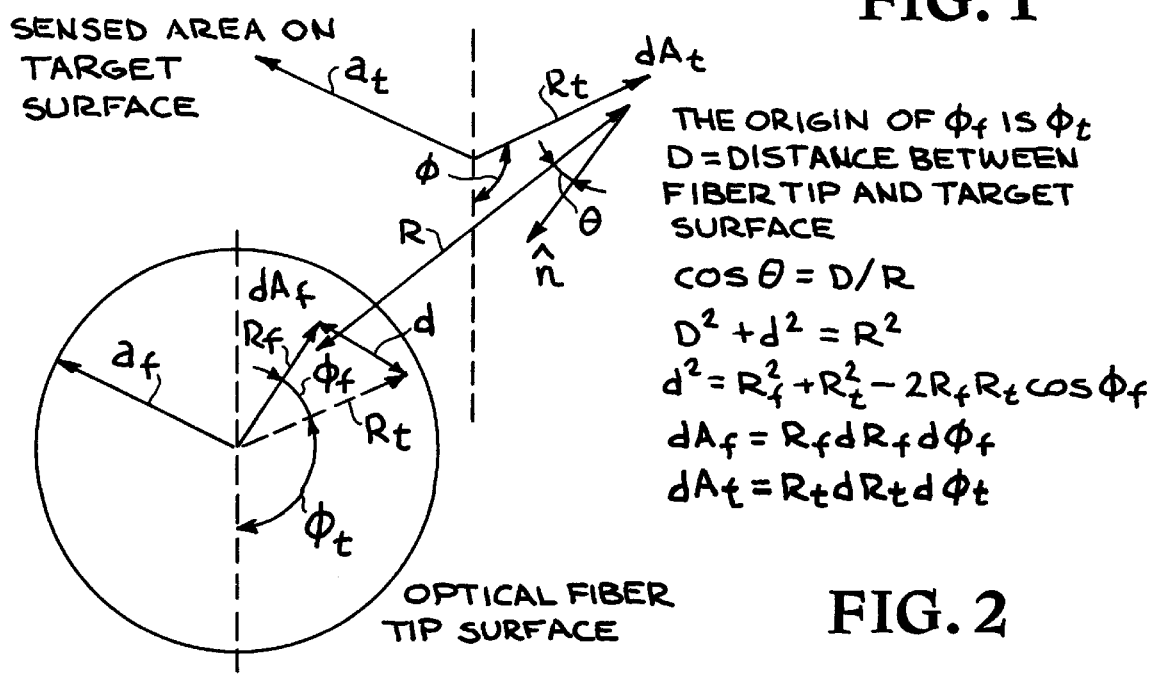
FIG. 2 shows geometries of the optical fiber tip and sensed target surface, and relationships between the various quantities.

$F(\lambda)$ is the fiber transmittance, $S(\lambda)$ is the detector response [V/W], $\lambda_{max}-\lambda_{min}$ is the spectral bandpass of the system, $\theta$ is the angle with respect to the target surface normal, $dA_f$ is an infinitesimal element of area on the surface of the fiber tip, $dA_t$ is an infinitesimal element of area on the surface of the target sensed by the fiber, and R is the distance from $dA_f$ to $dA_t$. The integral containing the geometric dependence can be calculated in polar coordinates using the radii and azimuthal angles of the fiber tip and sensed area. FIG. 2 shows the geometries of the optical fiber tip and target surface used to calculate the integral and relationships between the various quantities. Equation 2 can be rewritten in terms of the new variables as $$V_{bb}(T) = \frac{D^2}{\pi} \int_0^{a_t} dR_t \int_0^{a_f} dR_f \int_0^{2\pi} d\phi_f \int_0^{2\pi} d\phi_t \frac{R_f R_t}{(R_f^2 + R_t^2 - 2R_f R_t \cos\phi + D^2)^2} \int_{\lambda_{min}}^{\lambda_{max}} d\lambda W_{bb}(\lambda, T) F(\lambda) S(\lambda) V. \quad (4)$$

In the case of a graybody, the emissivity is not equal to 1 and is independent of wavelength. The spectral radiant emittance of a graybody is related to that of a blackbody (Equation 1) by $$W(\lambda, \epsilon, T) = \epsilon W_{bb}(\lambda, T) W \ cm^{-2} \ \mu m^{-1}, \quad (5)$$

where $\epsilon$ is the emissivity. Because the emissivity is less than 1, the ambient radiation field will be reflected from the target surface and contribute to the detected signal. The detected signal is then given by $$V(\epsilon, T_{targ}) = \epsilon V_{bb}(T_{targ}) + (1-\epsilon) V_{bb}(T_{bg}) V, \quad (6)$$

where $T_{targ}$ is the target temperature and $T_{bg}$ is the ambient background temperature. The first term represents the contribution from the target and the second term represents the contribution from the reflected ambient radiation field.

Because there are two unknowns in Equation 6, $T_{targ}$ and $\epsilon$, a second equation is needed to calculate their values. Addition of a detector with a different spectral bandpass will yield the necessary equation. It should be noted that the geometric dependence is the same for both detector equations, and so does not affect the temperature and emissivity calculation.

Figure 3:
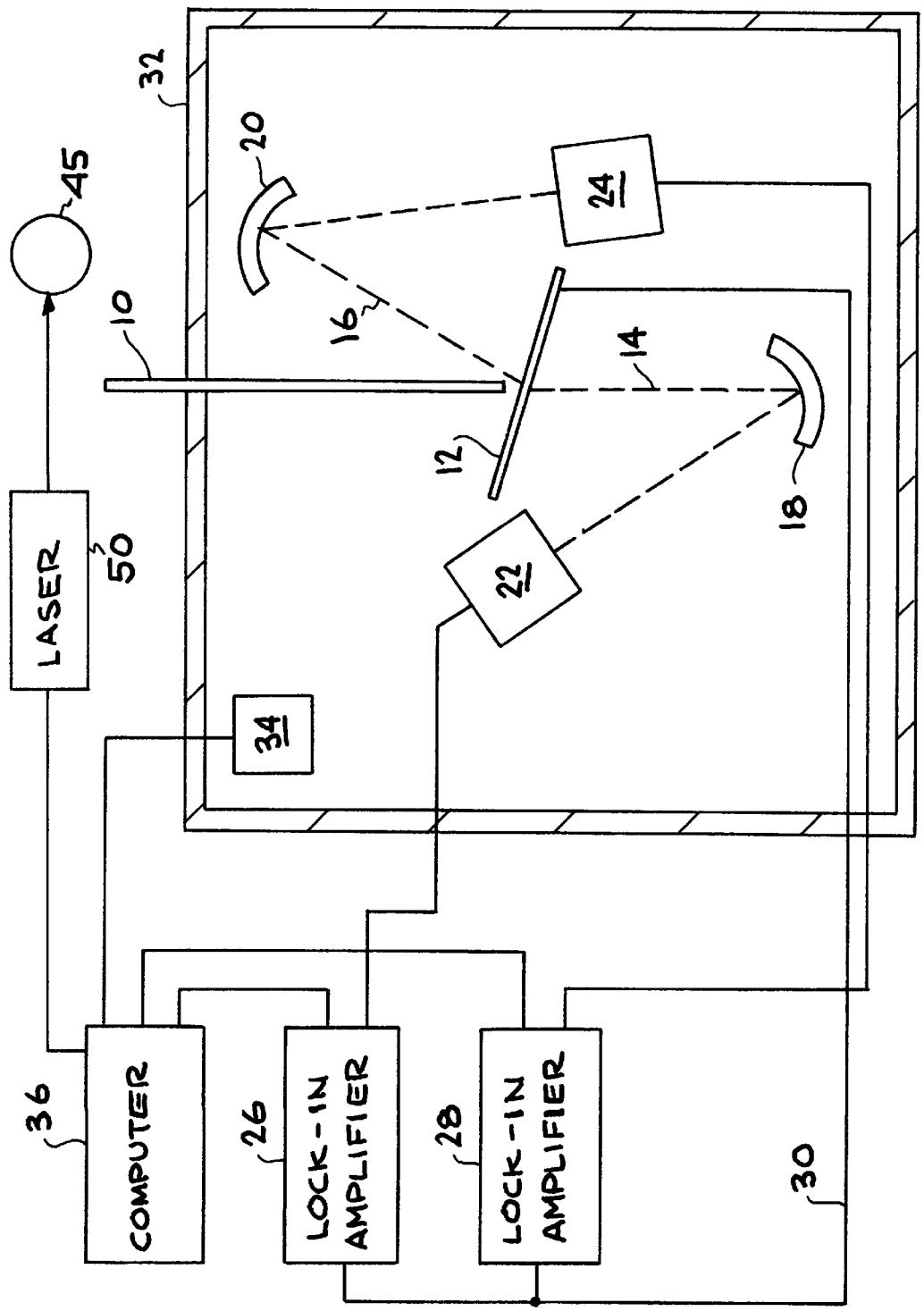
FIG. 3 shows a configuration for the single-fiber two-color pyrometer of the present invention.

FIG. 3 shows an embodiment of the two-color infrared thermometer of the present invention. A laser 50 illuminates a target 45, including biological tissue, and the radiation collected from target 45 is transmitted by fiber 10 and is either passed or reflected by chopper 12, simultaneously modulating the radiation by lock-in amplifiers 26, 28 and splitting the radiation into two paths, as indicated by dotted lines 14 and 16. These two paths can be further divided with beamsplitters to produce multiple paths. Chopper 12 provides a reference signal 30 to lock-in amplifiers 26, 28. Two spherical mirrors 18, 20, focus the radiation onto their corresponding photoconductors 22, 24. When additional beamsplitters are inserted into paths 14 and 16, corresponding mirrors and photoconductors must be added.

In a more specific embodiment of the invention shown in FIG. 3, fiber optic 10, comprising a 700 μm-bore hollow glass optical fiber coated with a dielectric layer on its inner surface, is used to collect the infrared radiation emitted by the target. The length of the fiber is 2 m. A gold-coated planar chopper 12 is used to modulate the incident radiation while simultaneously splitting the radiation into the two paths 14, 16. Two 128.8 mm-radius gold-coated spherical mirrors 18, 20, focus the radiation onto their corresponding thermoelectrically-cooled HgCdZnTe photoconductors 22, 24 (1×1 mm active area). The spectral bandpasses of the photoconductors 22, 24, are 2–6 μm and 2–12 μm and their response times are <100 ns and <10 ns, respectively. The two modulated signals are recovered using lock-in amplifiers 26, 28. The components are contained within a light-tight housing 32 which contains a port through which the hollow glass fiber extends. Also contained within the housing is a thermocouple 34 to monitor the temperature inside the housing. This reading is used to dynamically adjust the two lock-in signals to account for changes in the background radiance. The calculated temperature and emissivity values can then be used to control laser 50.

Figure 4:
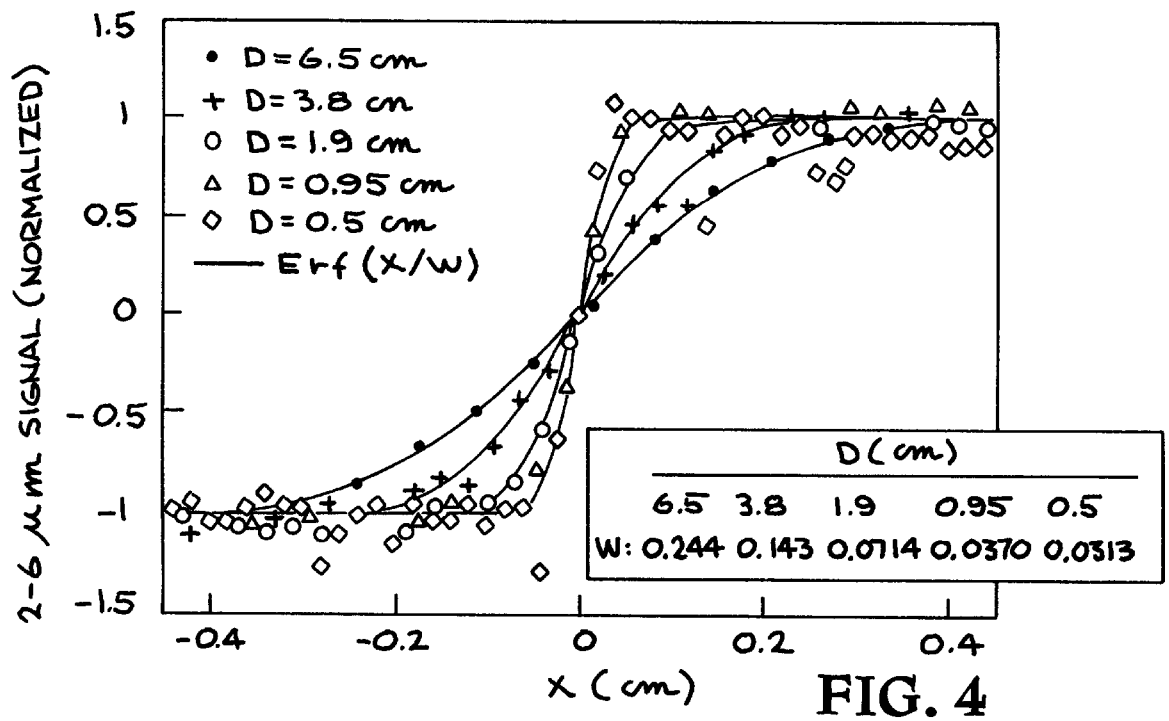
FIG. 4 shows normalized detector voltages as a function of scan distance across an interface between black anodized and white spray painted aluminum for various fiber heights.

The radial function describing the acceptance of the hollow glass optical fiber was determined experimentally by scanning the fiber across an interface between black anodized and white spray painted aluminum and recording the voltage signal from the 2–6 μm detector. Because the two surface types have different emissivities, they will yield two different signals. Scans at five fiber heights were done, and the resulting normalized signal versus scan distance curves were fit using the error function $$Erf\left(\frac{x}{w}\right) = \frac{2}{\sqrt{\pi}} \int_0^{x/w} \exp(-t^2)dt, \tag{7}$$

where x is the scan distance and w is the fit parameter. The scans and their fits are shown in FIG. 4 where normalized detector voltages are shown as a function of scan distance across an interface between black anodized and white spray painted aluminum for various fiber heights. The interface is located at x=0, with the black surface on the left and the white surface on the right.

The radial acceptance function of the optical fiber $H(R_t)$ is defined by the equation $$V(x) = V_{white} \int_{white} H(R_t) dA + V_{black} \int_{black} H(R_t) dA, \tag{8}$$

where V(x) is the detector voltage during the scan, $V_{white}$ is the detector voltage due to the white surface only, $V_{black}$ is the detector voltage due to the black surface only, $$\int_{white}$$

is the integral over the sensed area occupied by white surface, $$\int_{black}$$

is the integral over the sensed area occupied by the black surface, and $R_t$ is the radial distance on the target surface. The normalized solution of this equation is the Gaussian function $$H(R_t) = \exp\left[-\left(\frac{R_t}{w}\right)^2\right]. \tag{9}$$

Figure 5:
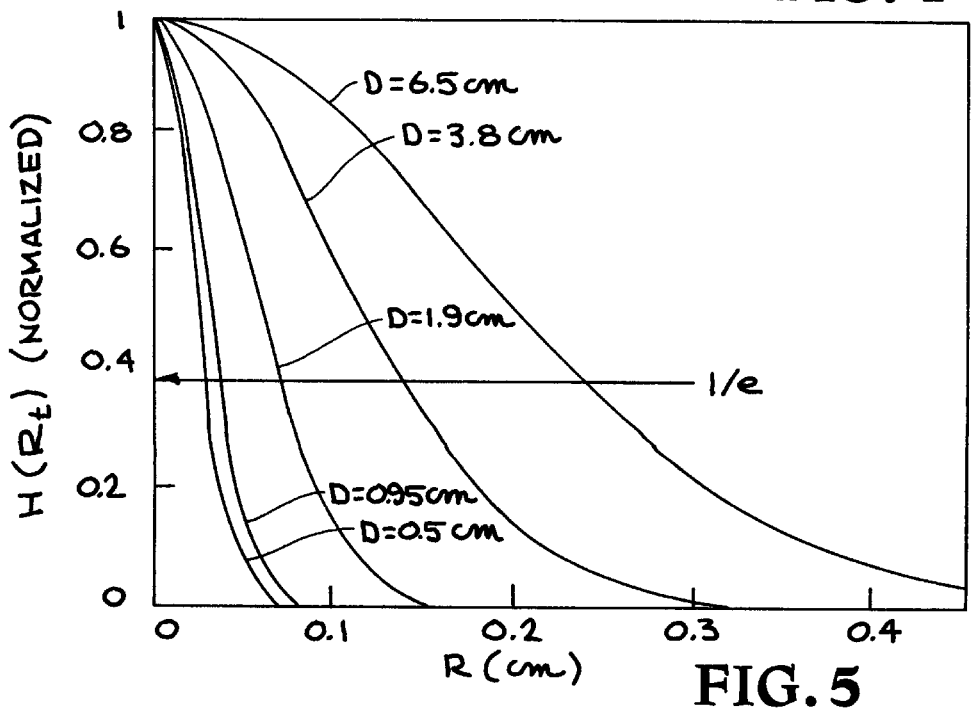
FIG. 5 shows the radial acceptance functions for the five scans in FIG. 4.

FIG. 5 shows the radial acceptance functions for the five scans in FIG. 4. Normalized radial acceptance functions for various fiber heights are shown. When $R_t$=w, the radial acceptance function is 1/e.

Plotting the Gaussian 1/e half-width parameter w versus the fiber height and fitting a line originating at the origin to the far field data points (FIG. 6) yields the general far field fiber acceptance function $$H(R_t) = \exp\left[-\left(\frac{R_t}{0.0375D}\right)^2\right], \tag{10}$$

where D is the fiber height above the target. The acceptance angle of the fiber is then about 2°.

Figure 6:
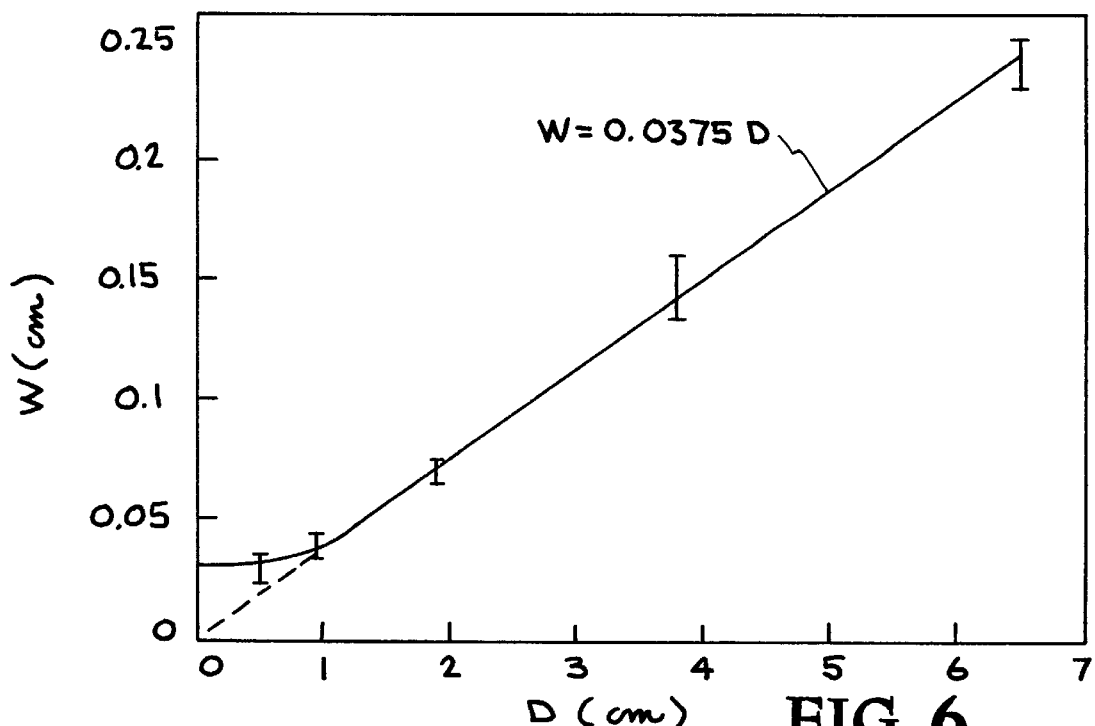
FIG. 6 shows Gaussian 1/e half-width fit parameter as a function of fiber height above the target surface.

In FIG. 6, the Gaussian 1/e half-width fit parameter is shown as a function of fiber height above the target surface. As D approaches zero, w approaches the bore radius (≈0.031 cm), and the linear fit is no longer valid. The effective bore (≈620 μm) is slightly smaller than the 700 μm hollow glass bore due to the dielectric layer on the glass surface. The error bars represent the upper and lower bounds on the values for w that could fit the scans in FIG. 4.

The theoretical blackbody temperature response of each of the two detectors using a hollow glass optical fiber to collect the radiation is approximated using Equation 2 with the fiber acceptance function (Equation 10) in place of the two cosines. Using the polar coordinates described in FIG. 2, the new equation is given by $$V_{bb}(T) = \frac{1}{\pi} \int_0^\infty dR_t \int_0^{a_t} dR_f \int_0^{2\pi} d\phi_f \int_0^{2\pi} d\phi_t \frac{R_f R_t \exp\left[-\left(\frac{R_t}{0.0375D}\right)^2\right]}{(R_f^2 + R_t^2 - 2R_f R_t \cos\phi_f + D^2)} \int_{\lambda_{min}}^{\lambda_{max}} d\lambda W_{bb}(\lambda, T) F(\lambda) S(\lambda) V. \quad (11)$$

Figure 7:
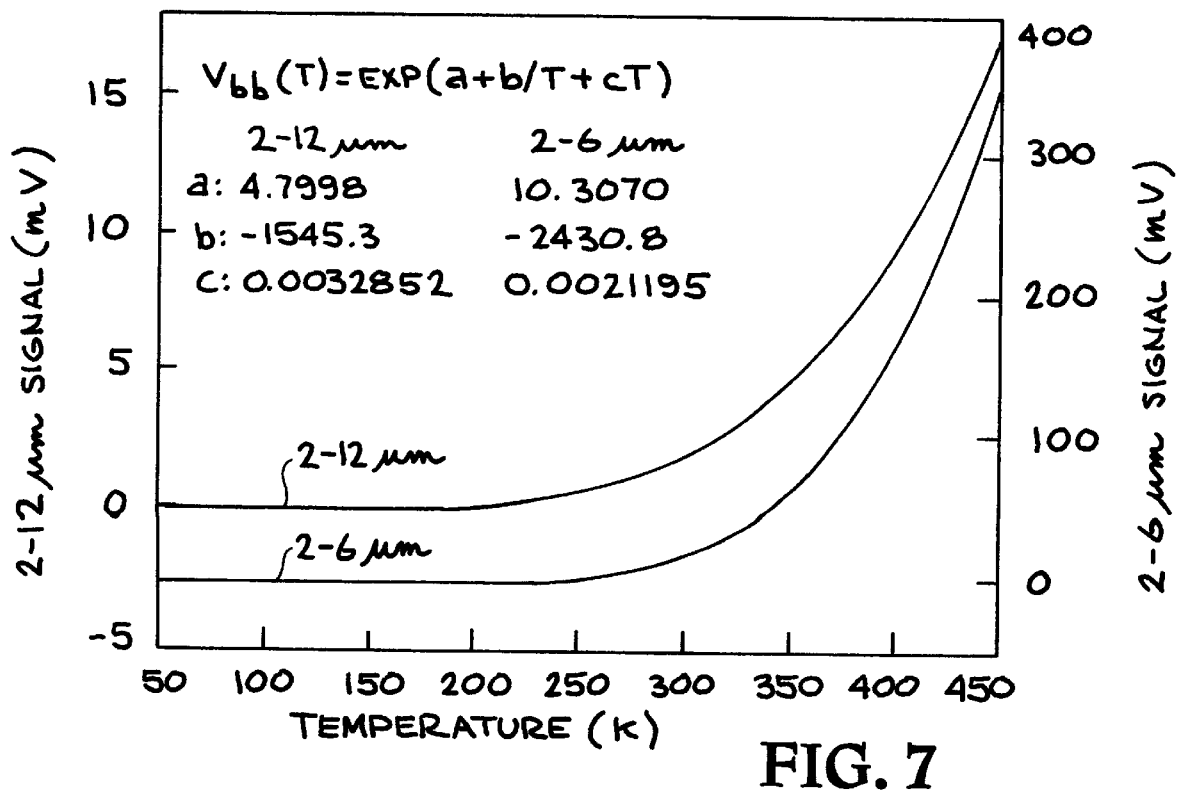
FIG. 7 shows theoretical blackbody temperature responses of the 2–6 $\mu$m and 2–12 $\mu$m detectors using a hollow glass optical fiber to collect the radiation.

Because $R \approx D$ as a result of the small acceptance angle, $V_{bb}(T)$ is nearly invariant with respect to the fiber height D. The results for D=3.8 cm are shown in FIG. 7. The curves were fit using an exponential function of the form $$V_{bb}(T) = \exp\left(a + \frac{b}{T} + cT\right), \quad (12)$$

where a, b, and c are the fit parameters. FIG. 7 shows the theoretical blackbody temperature responses of the 2–6 µm and 2–12 µm detectors using a hollow glass optical fiber to collect the radiation.

The two-color system of the present invention measures the radiation intensity in each of the spectral bands using lock-in amplification. The lock-in signals are proportional to the difference between the signals originating from the chopper in the open position and closed position. As the chopper rotates (i.e., alternates passing and reflecting the incident target radiation), the detected radiation alternates between target plus background and chopper plus background for the 2–12 µm detector, and target plus chopper plus background and background for the 2–6 µm detector. The lock-in subtraction results in a measured signal of the target minus the chopper for the 2–12 µm detector and the target plus the chopper for the 2–6 µm detector. The contribution from the chopper is effectively a constant offset that is independent of the target radiance. Therefore, subtraction of this offset from the measured lock-in signal is required to arrive at the true target signal. It should be noted that this offset is equivalent to the lock-in signal generated by a blackbody target that is sufficiently cold to render the target equal to zero.

Figure 8:
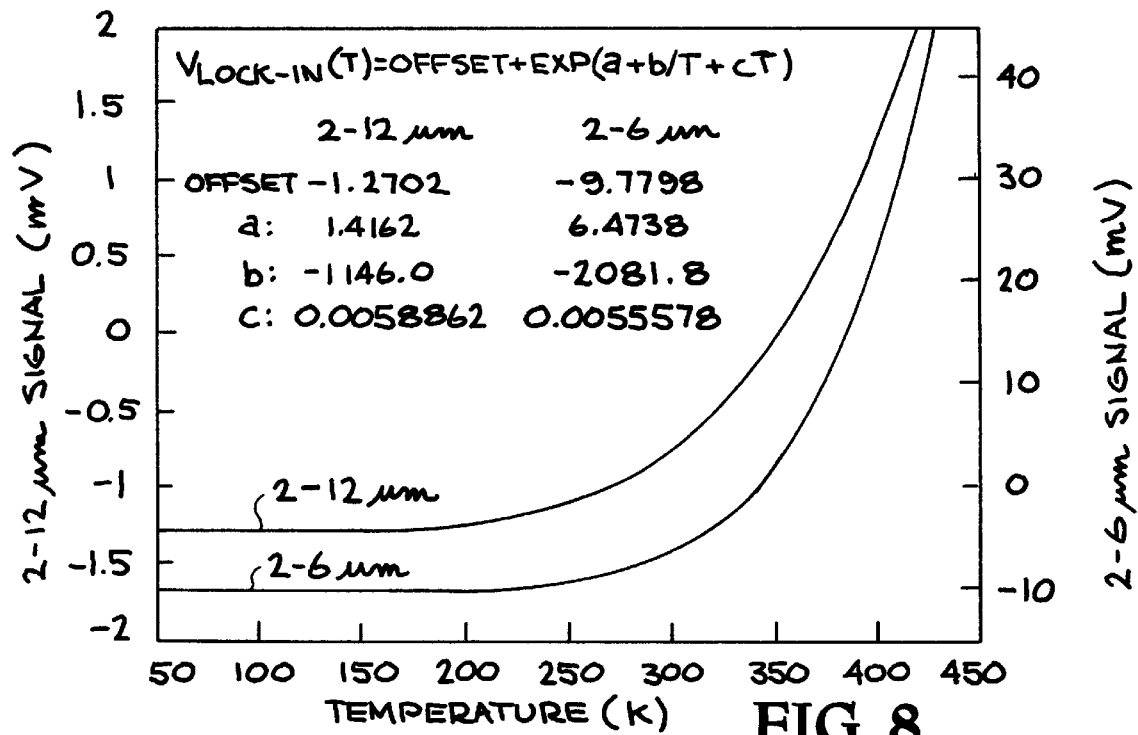
FIG. 8 shows detector calibration curves.

The system was calibrated by measuring the lock-in signal of each spectral band as a function of the target temperature using a blackbody target. A thermocouple was placed in the blackbody to measure its actual temperature. The two calibration curves were fit using the exponential function in Equation 12 with an additional fit parameter to compensate for the offset in the lock-in signal, $$V_{lock-in}(T) = \textit{offset} + \exp\left(a + \frac{b}{T} + cT\right), V \quad (13)$$

where $V_{lock-in}(T)$ is the lock-in signal and offset, a, b, and c are the fit parameters. The calibration curves and their fits are shown in FIG. 8. As described above, offset is equivalent to the signal originating from the chopper, and is governed mainly by the ambient temperature near the chopper. It follows that the signal originating from the blackbody only is given by $$V_{bb}(T) = V_{lock-in}(T) - \textit{offset} = \exp\left(a + \frac{b}{T} + cT\right). \quad (14)$$

Fiber transmittance (which is essentially independent of the wavelength within the measurement band) and system alignment govern a, which is effectively a scaling factor. Prior to using the system, offset and a are finely adjusted by measuring the lock-in signals from a cool blackbody and a warm blackbody, respectively. Because the response of the detectors is relatively flat for cooler temperatures and steeper for warmer temperatures, a cool blackbody is used to adjust the value of offset and a warm blackbody is used to adjust the value of a. Using the original values of a, b, and c, the known cool blackbody temperature, and the measured lock-in voltage, a new value of offset is calculated from the calibration equation. Similarly, a new value of a is calculated using the current offset value, the original values of b and c, the known warm blackbody temperature, and the measured lock-in voltage. The parameters b and c are solely related to the response of the detectors and do not change significantly. These final fits are used to numerically solve for the temperature and emissivity during measurement of target signals. In the detector calibration curves of FIG. 8, the lock-in signals from the two detectors were measured as a function of the temperature of a blackbody and were fit with an exponential function.

Variations in the background signal arising from temperature drifts within the housing (i.e., offset) are compensated by independently measuring the temperature within the housing (with a thermocouple) and applying temperature dependent corrections to the measured signals. To determine the appropriate corrections, the signals from a blackbody at constant temperature were measured as a function of the background temperature.

Figure 9:
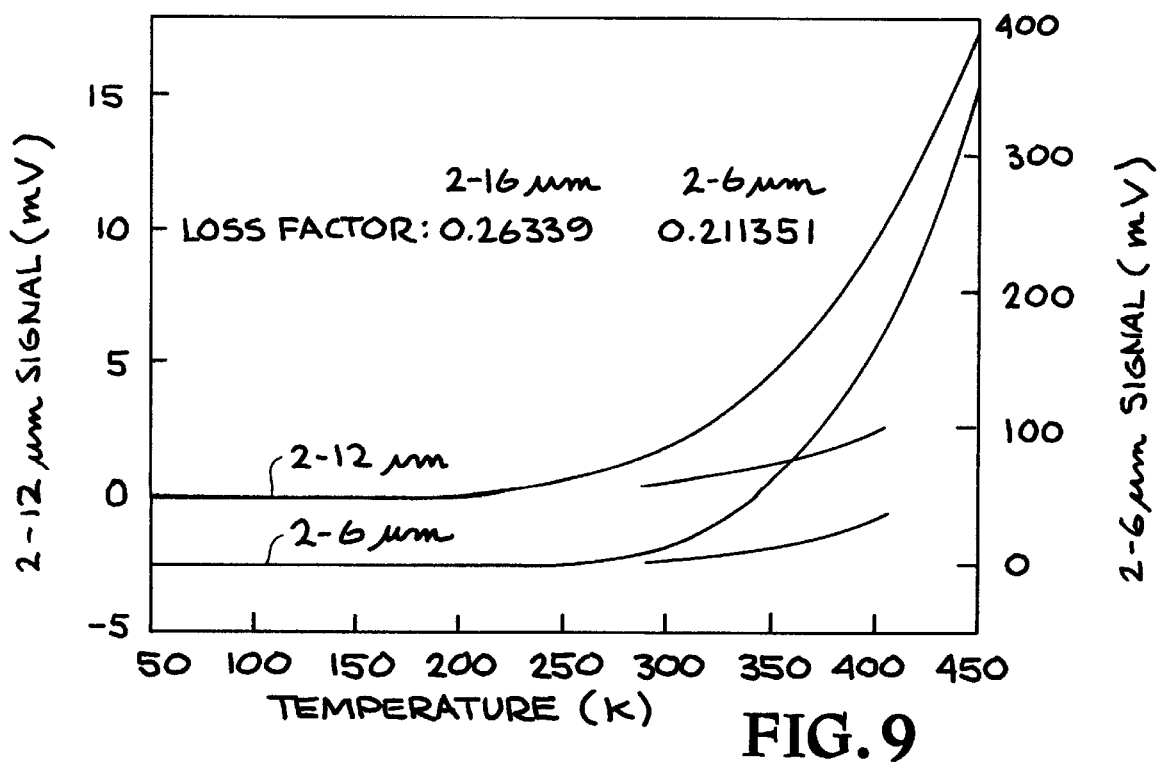
FIG. 9 shows the theoretical blackbody temperature response for each of the two detectors compared to the corresponding experimentally determined calibration ($V_{lock-in}(T)$–offset).

FIG. 9 shows the theoretical blackbody temperature response for each of the two detectors compared to the corresponding experimentally determined calibration ($V_{lock-in}(T)$–offset). Division of each experimental curve by a particular constant resulted in excellent agreement with theory. This constant represents the losses introduced by the real system, which were not included in the theoretical calculation.

Substituting the experimentally determined blackbody temperature response (Equation 13) into Equation 6, the resulting equation for a non-blackbody target is $$V_{lock-in}(\varepsilon, T_{targ}) - \textit{offset} = \quad (15)$$
$$\varepsilon \exp\left(a + \frac{b}{T_{targ}} + cT_{targ}\right) + (1-\varepsilon)\exp\left(a + \frac{b}{T_{bg}} + cT_{bg}\right).$$

These two equations, one for each spectral band, can be solved simultaneously for temperature and emissivity. However, no solution exists when $T_{targ}=T_{bg}$, which prevents temperature and emissivity measurement when the target temperature is near the background temperature. This problem was avoided by solving one equation for the temperature, and then solving the other equation for the emissivity. An initial value of 1 is chosen for the emissivity, and the resulting value for the temperature is calculated using the 2–6 µm detector equation. Using this temperature value, a new value for the emissivity is calculated using the 2–12 µm detector equation. The new emissivity value is then substituted into the 2–6 µm detector equation, and the process continues until the emissivity converges to its final value. In order to smooth the output, the emissivity values yielded by the 2–12 µm detector equation are subjected to a low-pass filter. Though this algorithm contains almost no emissivity information in the case of $T_{targ} \approx T_{bg}$, thus returning invalid emissivity values and temperature values based on the background temperature (for high emissivity targets, the calculated temperature values are fairly accurate), it does not diverge.

Figure 10:
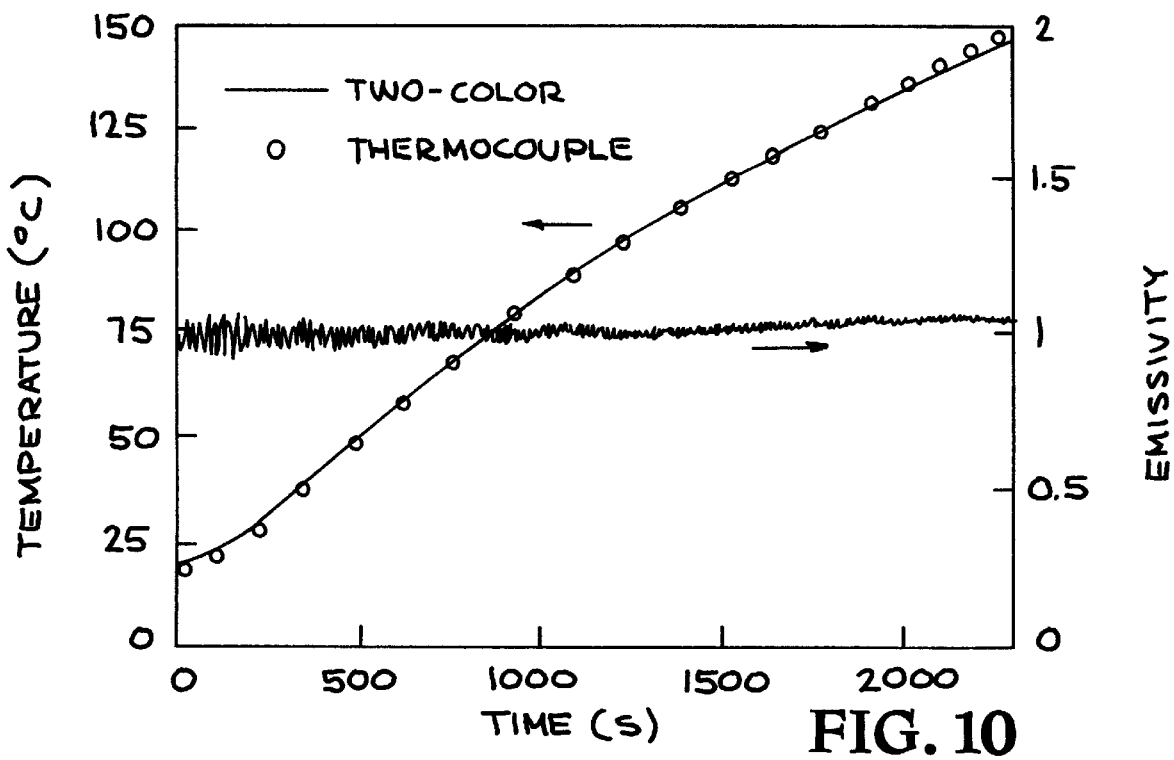
FIG. 10 shows temperature and emissivity of a blackbody measured 5 with the two-color infrared thermometer.

The temperature and emissivity of a blackbody were measured with the two-color system and the calculated temperature was compared with a thermocouple reading (FIG. 10). The blackbody was a 4×4×4 inch aluminum block with a 1.5×1.5×1.5 inch hollow cavity in the center. The thermocouple was placed within the aluminum wall. The hollow glass fiber was inserted through a bore in the aluminum wall such that the fiber tip was flush with the cavity edge. The two-color temperature is in good agreement with the thermocouple reading. The same type of blackbody was used for the initial detector calibration (FIG. 8), and was used to adjust the offset and scaling parameters at 20° C. and 112° C., respectively, prior to the measurement.

Figure 11:
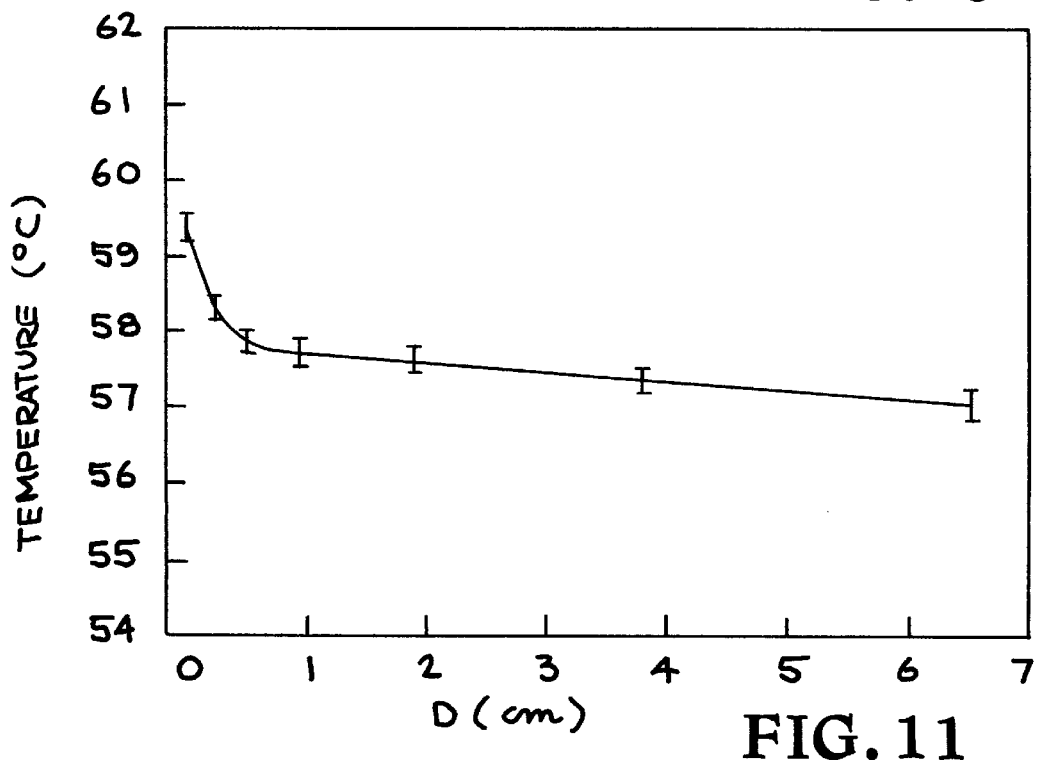
FIG. 11 shows the two-color temperature versus the fiber-to-target distance for a uniformly heated target.

FIG. 11 shows the two-color temperature versus the fiber-to-target distance for a uniformly heated target. A black anodized aluminum block was maintained at constant temperature (monitored by a thermocouple) on a hot plate and the two-color temperature was measured as a function of the fiber height above the surface. The calculated two-color temperature is nearly flat for fiber heights above 1 cm; the slight dependence is probably due to a small difference in the numerical aperture of the hollow glass fiber for the two wavelength bands. A more pronounced dependence is evident below 1 cm, where the far field linear relationship between the sensed radius (acceptance function half-width) and fiber height breaks down (FIG. 6). The error bars (standard deviation) represent the noise in the calculated temperature.

The single-fiber two-color infrared thermometer of the present invention has many attractive characteristics for dynamic remote, non-contact temperature measurement. The reflective chopper performs two tasks simultaneously: (1) modulation and (2) splitting of the incident radiation. This component eliminates the need for additional beam-splitting means, simplifying the overall design and increasing the amount of target signal incident upon the detectors. Because the design involves two separate detection paths, detectors can be added, subtracted, or swapped freely, and filters can be easily introduced as a means of limiting the bandpass in a single path. Higher temperature regimes can be measured by simply changing to a fiber and detectors with bandpasses at shorter wavelengths, while keeping the rest of the system intact. Use of a single fiber eliminates the problem of aligning two fibers to a common spot on the target. Because the radiation observed through both bands originates from the same geometric region on the target (which may not be true when a separate fiber is used to collect radiation for each band), the calculated temperature and emissivity are effectively independent of the fiber-to-target distance (for a target of uniform temperature over the observed surface area). As a result of the two-color principle, the true temperature and emissivity of a target are determined assuming the emissivity is independent of wavelength within the measurement band. Furthermore, correction for reflection of the background radiation field from the target surface enables more precise measurements. The mid-infrared bandpasses of the hollow glass fiber and HgCdZnTe photoconductors, coupled with lock-in amplification, permit low-temperature measurement. The small acceptance angle of the hollow glass optical fiber provides high spatial resolution. Furthermore, the hollow glass fiber is robust and, unlike silver halide mid-infrared transmitting fiber, does not degrade under room lights.

As an example of the method of the present invention, Equation 15 can be solved for $T_{targ}$ using the quadratic formula, yielding the formula $$T_{targ} = \frac{G + \sqrt{G^2 - 4bc}}{2c}, \quad (16)$$

where $$G = \ln\left[\frac{V_{lock-in} - offset - \exp(a + b/T_{bg} + cT_{bg})}{\varepsilon} + \exp(a + b/T_{bg} + cT_{bg})\right] - a. \quad (17)$$

Equation 15 can also be solved for $\varepsilon$, yielding the formula $$\varepsilon = \frac{V_{lock-in} - offset - \exp(a + b/T_{bg} + cT_{bg})}{\exp(a + b/T_{targ} + cT_{targ}) - \exp(a + b/T_{bg} + cT_{bg})}. \quad (18)$$

A possible method of solution for a two-color system ($T_{bg}$ is measured with a thermocouple) is as follows:

Step 1. Initialize $\varepsilon = 1$.

Step 2. Obtain $V_{lock-in}$ values for both detectors.

Step 3. Substitute $\varepsilon$ and the 2–6 μm $V_{lock-in}$ into Equation 16 and calculate $T_{targ}$ using the 2–6 μm parameters.

Step 4. Substitute $T_{targ}$ and the 2–12 μm $V_{lock-in}$ into Equation 18 and calculate $\varepsilon$ using the 2–12 μm parameters.

Step 5. Compare the new $\varepsilon$ to the previous $\varepsilon$: if their difference is small enough (converged), then go to Step 2; otherwise, go to Step 3.

A sample calculation using the parameter values shown in FIG. 8 is given in Table 1.

TABLE 1

Sample calculation*

| Iteration | $T_{targ}$ (K) | $\varepsilon$ |
|---|---|---|
| 1 | 342.7021 | 0.9657960 |
| 2 | 343.7982 | 0.9376758 |
| 3 | 344.7410 | 0.9144915 |
| 4 | 345.5486 | 0.8953301 |
| 5 | 346.2380 | 0.8794587 |
| 6 | 346.8248 | 0.8662888 |
| 7 | 347.3229 | 0.8553438 |
| 8 | 347.7451 | 0.8462349 |
| 9 | 348.1021 | 0.8386469 |
| 10 | 348.4036 | 0.8323179 |
| 11 | 348.6581 | 0.8270354 |
| 12 | 348.8724 | 0.8226240 |
| 13 | 349.0529 | 0.8189377 |
| 14 | 349.2047 | 0.8158557 |
| 15 | 349.3324 | 0.8132782 |
| 16 | 349.4397 | 0.8111209 |
| 17 | 349.5299 | 0.8093151 |
| 18 | 349.6057 | 0.8078023 |
| 19 | 349.6693 | 0.8065369 |
| 20 | 349.7226 | 0.8054764 |
| 21 | 349.7674 | 0.8045887 |
| 22 | 349.8050 | 0.8038446 |
| 23 | 349.8365 | 0.8032221 |
| 24 | 349.8629 | 0.8026999 |
| 25 | 349.8850 | 0.8022633 |
| 26 | 349.9036 | 0.8018966 |

TABLE 1-continued

Sample calculation*

| Iteration | $T_{targ}$ (K) | ε |
|---|---|---|
| 27 | 349.9192 | 0.8015888 |
| 28 | 349.9323 | 0.8013309 |
| 29 | 349.9433 | 0.8011154 |
| 30 | 349.9525 | 0.8009347 |
| 31 | 349.9602 | 0.8007827 |
| 32 | 349.9666 | 0.8006560 |
| 33 | 349.9720 | 0.8005499 |
| 34 | 349.9766 | 0.8004604 |

*ε was initially 1

The following values were used:

2–6 μm $V_{lock-in}$=0.2324250 mV

2–6 μm $V_{lock-in}$=−0.1982069 mV $T_{bg}$=293.15 K

Note: ε was initially 1. Note that in the algorithm, the most recent value for emissivity is used to start subsequent calculations after obtaining new lock-in signals, resulting in fewer iterations. Note that substituting the final temperature and emissivity values back into Equation 15 yields the given lock-in signals.

Changes and modifications in the specifically described embodiments can be carried out without departing from the scope of the invention, which is intended to be limited by the scope of the appended claims.

The invention claimed is:

1. A method for determining a temperature of a target $T_{targ}$, comprising:

measuring an ambient background temperature $T_{bg}$;

collecting and transmitting target light with a fiber optic;

chopping and separating into at least two beams, light transmitted from said fiber optic;

initializing ε=1, where ε is an emissivity of said target;

obtaining a first lock-in amplifier value $V_{lock-in}$ from a first detector having a spectral bandpass of 2–6 μm, wherein said first detector is electrically connected to a first lock-in amplifier, wherein said first detector is positioned to detect light from a first beam of said at least two beams;

obtaining a second lock-in amplifier value $V_{lock-in}$ from a second detector having a spectral bandpass of 2–12 μm, wherein said second detector is electrically connected to a second lock-in amplifier, wherein said second detector is positioned to detect light from a second beam of said at least two beams;

substituting ε and said first lock-in amplifier value $V_{lock-in}$ into the following equation to calculate $T_{targ}$:

$$T_{targ} = \frac{G + \sqrt{G^2 - 4bc}}{2c},$$

where $$G = \ln\left[\frac{V_{lock-in} - \textit{offset} - \exp(a + b/T_{bg} + cT_{bg})}{\varepsilon} + \exp(a + b/T_{bg} + cT_{bg})\right] - a,$$

offset=−9.7798, a=6.4738, b=−2081.8 and c=0.0055578;

substituting $T_{targ}$ and said second lock-in amplifier value $V_{lock-in}$ into the following equation to calculate a new ε:

$$\varepsilon = \frac{V_{lock-in} - \textit{offset} - \exp(a + b/T_{bg} + cT_{bg})}{\exp(a + b/T_{targ} + cT_{targ}) - \exp(a + b/T_{bg} + cT_{bg})},$$

where offset=−1.2702, a=1.4162, b=−1146.0 and c=0.00588862;

comparing said new ε to the previous ε, and if their difference is small enough, then stop; otherwise, repeating the method using said new ε.

2. A method for determining a temperature of a target $T_{targ}$, comprising:

measuring an ambient background temperature $T_{bg}$;

collecting and transmitting target light with a fiber optic;

chopping and separating into at least two beams, light transmitted from said fiber optic;

initializing ε=1, where ε is an emissivity of said target;

obtaining a first lock-in amplifier value $V_{lock-in}$ from a first detector having a first spectral bandpass, wherein said first detector is electrically connected to a first lock-in amplifier, wherein said first detector is positioned to detect light from a first beam of said at least two beams;

obtaining a second lock-in amplifier value $V_{lock-in}$ from a second detector having a second spectral bandpass which may overlap said first spectral bandpass, wherein said second detector is electrically connected to a second lock-in amplifier, wherein said second detector is positioned to detect light from a second beam of said at least two beams;

substituting ε and said first lock-in amplifier value $V_{lock-in}$ into the following equation to calculate $T_{targ}$:

$$T_{targ} = \frac{G + \sqrt{G^2 - 4bc}}{2c},$$

where $$G = \ln\left[\frac{V_{lock-in} - \textit{offset} - \exp(a + b/T_{bg} + cT_{bg})}{\varepsilon} + \exp(a + b/T_{bg} + cT_{bg})\right] - a,$$

wherein offset, a, b, and c are the fit parameters for said first detector;

substituting $T_{targ}$ and said second lock-in amplifier value $V_{lock-in}$ into the following equation to calculate a new ε:

$$\varepsilon = \frac{V_{lock-in} - \textit{offset} - \exp(a + b/T_{bg} + cT_{bg})}{\exp(a + b/T_{targ} + cT_{targ}) - \exp(a + b/T_{bg} + cT_{bg})},$$

where offset=−1.2702, wherein offset, a, b, and c are the fit parameters for said second detector;

comparing said new ε to the previous ε, and if their difference is small enough, then stop; otherwise, repeating the method using said new ε.

* * * * *